J. PARR.
GUARD FOR SET SCREWS.
APPLICATION FILED JAN. 15, 1909.
949,087.
Patented Feb. 15, 1910.
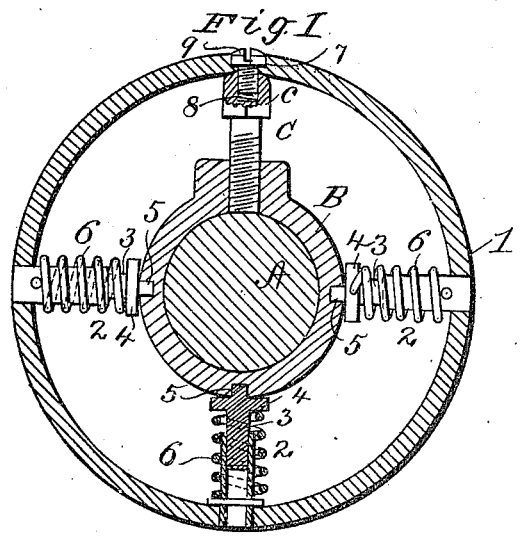
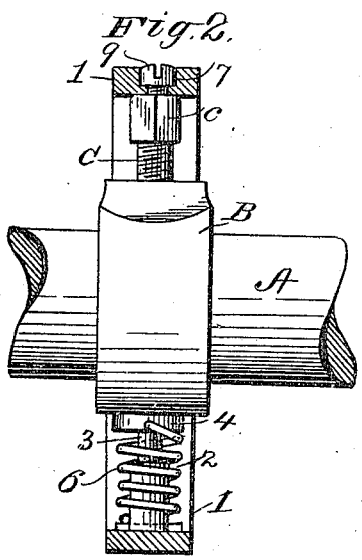
Witnesses
Inventor
John Parr
By
Attorneys

UNITED STATES PATENT OFFICE.

JOHN PARR, OF MARION, OHIO.

GUARD FOR SET-SCREWS.

949,087.    Specification of Letters Patent.    Patented Feb. 15, 1910.

Application filed January 15, 1909. Serial No. 472,479.

*To all whom it may concern:*

Be it known that I, JOHN PARR, citizen of the United States, residing at Marion, in the county of Marion and State of Ohio, have invented certain new and useful Improvements in Guards for Set-Screws, of which the following is a specification.

The object of this invention is an improved device which is designed to be applied to a shaft to prevent a projecting set screw from catching the clothing of a bystander when the shaft is rotating. And a further object of the invention is a device of the character described which may be readily applied to shafts of different sizes and which does not interfere with the adjustment of the set screw.

With these and other objects in view that will more fully appear as the description proceeds, the invention consists in certain constructions and arrangements of parts that I shall hereinafter fully describe and claim.

For a full understanding of the invention and the merits thereof, reference is to be had to the following description and the accompanying drawing, in which:

Figure 1 is a longitudinal section of my improved set screw showing it applied, and, Fig. 2 is a transverse section thereof.

Corresponding and like parts are referred to in the following description and indicated in all the views of the drawing by the same reference characters.

Referring to the drawing, A designates a shaft to which my invention is applied and upon which is mounted a bearing collar B that is held rigidly in position by a set screw C, the head *c* of said set screw projecting outwardly from the collar and being preferably square in cross section in order that the set screw may be readily turned by a wrench.

My improved device embodies a rim 1 that encircles the shaft A and the collar B and that is spaced therefrom as shown with a portion of its inner surface bearing against the head *c* of the set screw C. In order to sustain the rim in this spaced relation, the latter is provided with a plurality of radially and inwardly extending socket members 2 in which are mounted for longitudinal movement plungers 3 that are formed at their inner ends with laterally enlarged heads 4, said heads being formed with pins or teeth 5 projecting inwardly therefrom. Expansion springs 6 encircle the socket members with one end bearing against the inner surface of the rim 1 and the other end against the heads of the plungers 3, whereby to force the latter inwardly with the pins 5 thereof bearing against the collar and preferably received in depressions formed in the periphery thereof. In order to further secure the rim in proper spaced relation to the collar and to hold the rim in alinement with the set screw C, said rim is secured to the latter by any suitable means. In the present instance the rim is formed with an aperture 7 in registry with a threaded opening 8 in the head *c* of the set screw, and a rim screw 9 is mounted in said aperture and said opening and holds the rim securely in an operative position. It will be noted that by this arrangement when it is desired to manipulate the set screw, it is only necessary to loosen the rim screw to permit the former to be readily and conveniently turned.

From the above description in connection with the accompanying drawing, it will be seen that I have provided a simple, durable and efficient construction of device of the character described the use of which is obvious.

Having thus described the invention, what I claim is:

1. A set-screw guard comprising a rim provided with a plurality of socket members projecting radially inwardly therefrom, and plungers slidably mounted in the respective socket members and spring-pressed inwardly beyond the same and provided at their inner ends with engaging means.

2. A set-screw guard comprising a rim having a plurality of socket members disposed thereon and projecting radially inwardly therefrom, plungers slidably mounted in the respective socket members and formed at their inner ends with laterally enlarged heads carrying engaging means, and expansion springs encircling the socket members and interposed between the rim and the heads to project the plungers inwardly.

3. A set screw guard comprising a rim adapted to encircle a shaft, and a plurality of radially disposed plungers slidably connected to the rim and inwardly springpressed to hold the same in position on the shaft.

4. A set screw guard comprising a rim having a plurality of socket members projecting inwardly therefrom, plungers slidably mounted in the respective socket members and formed at their inner ends with laterally enlarged heads having central longitudinal projections, and springs encircling the socket members and interposed between the rim and the heads to slide the plungers inwardly.

5. The combination with a shaft having a set screw outstanding therefrom, of a guard of the character described comprising a rim surrounding the shaft in spaced relation thereto and extending outside of the set screw, means interposed between the rim and the shaft for yieldingly supporting the former from the latter, and means for detachably fixing the rim to the set screw.

In testimony whereof I affix my signature in presence of two witnesses.

JOHN PARR. [L. S.]

Witnesses:
H. E. SAMPSON,
H. EDMUND HILL.